Sept. 17, 1963  D. J. R. HOARE  3,103,945
FILLER, BUILD-UP, VENT AND DRAIN VALVE UNIT
Filed Dec. 13, 1960
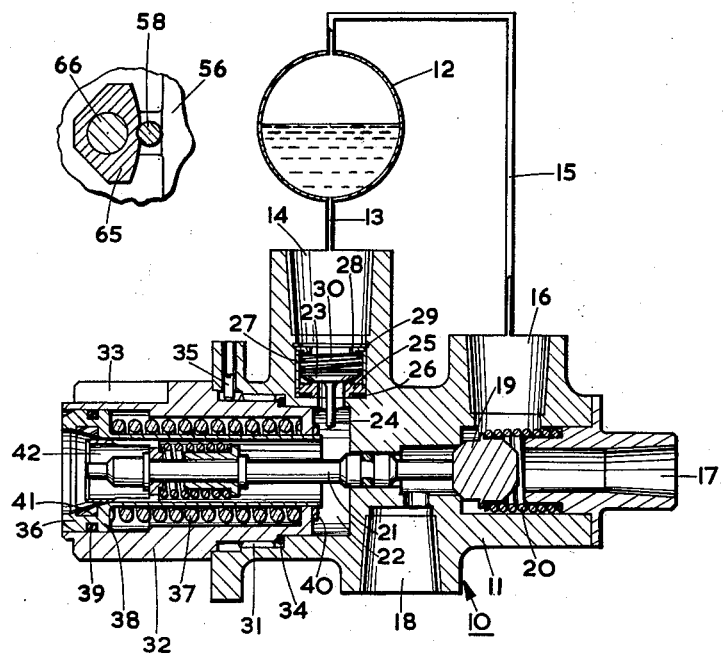

United States Patent Office 3,103,945
Patented Sept. 17, 1963

3,103,945
FILLER, BUILD-UP, VENT AND DRAIN VALVE UNIT
David J. R. Hoare, West Coker, England, assignor to Normalair Limited, Yeovil, England
Filed Dec. 13, 1960, Ser. No. 75,518
Claims priority, application Great Britain Dec. 19, 1959
4 Claims. (Cl. 137—317)

This invention relates to improved means for draining liquified gases stored in containers.

The invention also relates more specifically, although not exclusively, to improved means for draining liquid oxygen from converters used in aircraft. Although liquid oxygen is referred to hereafter, it is to be understood that any gas which can be liquified under moderate pressures and can be stored at low temperatures in a vacuum walled or insulated container is to be included.

It is known that a convenient method of charging liquid oxygen converters makes use of what is termed a "filler build-up and vent valve" normally mounted on the skin of an aircraft near the converter. This unit has a fixed bayonet connector so that a hose coupling may be attached. For conveience of description, the bayonet parts attached to the "filler build up and vent valve" unit will be termed the "fixed bayonet" and the corresponding part which is removable with the hose will be termed the "charging hose bayonet."

The filler, build up and vent valve has associated with it a non-return valve in conduit connection with the bottom of the liquid oxygen converter and this valve is held on its seat by fluid pressure and a light spring when the converter is on normal use.

When it is desired to fill the converter the "charging hose bayonet" is attached to the fixed bayonet and a fluid tight seal is effected. A central stem in the charging hose coupling moves a spindle and associated valves in the filler, build-up and vent valve unit so that pressure in the container is released to ambient and the conduit supplying gas from the converter is closed. The liquid oxygen has a charging pressure of about 20 p.s.i. above atmospheric pressure and this lifts the non-return valve from its seating allowing liquid oxygen to fill the converter.

The foregoing description of a known filler, build-up and vent valve unit has been made in order to show the state of the art and to serve as a basis to define the improvement made by this invention.

It is often required to drain unused liquid oxygen from a converter installed in an aircraft. The draining of the converter can be carrried out in several ways. One method is to vent the converter to ambient and allow the contents to evaporate. This method has the disadvantage that with the high thermal insulation of the converter the time involved to drain a converter is considerable.

Another method is to vent the converter to ambient pressure and then open a pipe in the liquid phase by means of a valve or removable plug, allowing liquid to drain under the effect of liquid pressure head. This method has the disadvantages in time taken and also an access must be provided to the valve or plug and consequent sealing after draining.

A further method is to provide a valve in the liquid phase and to drain the converter whilst it is still pressurised. This method has advantages in time but has disadvantages in that access to the valve and a drain pipe must be provided to safely convey liquid away from the operator.

It is an object of this invention to provide draining means as a modification to an existing filler, build-up and vent valve unit of a liquid oxygen supply system.

It is a further object of this invention to provide a filler, build-up, vent and drain valve unit wherein a non-return valve is held on its seating by pressure acting on an area substantially equal to the area of the bore of its seating.

It is a further object to provide manually operable draining coupling means.

It is a further object to provide manually operable draining coupling means that automatically returns to the closed position upon release of manual pressure, said coupling means being an attachment to a filler, build-up, vent and drain valve unit of a liquid oxygen supply system.

The invention will now be described by way of an example in which:

FIGURE 1 is a section through a filler, build-up, vent and drain valve of a liquid oxygen supply system showing a part of the draining arrangements.

FIGURE 2 is a section through the draining coupling showing it attached to the fixed bayonet of the filler build-up, vent and drain valve unit.

FIGURE 3 is a part section taken on line III—III showing details of the operating cam.

Referring to FIGURE 1, the filler, build-up, vent and drain valve unit shown generally at 10 has a body 11 connected by conduits to liquid oxygen converter 12. The conduit 13 from the liquid phase of the converter 12 is connected to a liquid port 14 in the body 11. The top of the converter 12 is connected by conduit 15 to the gas port 16 of the body 11. A supply port 17 and a vent port 18 are formed in the body 11 to communicate with the gas port 16. A valve 19 having two seating faces is arranged to close either the communication between 16 and 18 or 16 and 17. A spring 20 normally holds the valve 19 in a position closing communication between gas port 16 and vent port 18. A central stem 21 connected to the valve 19 passes through the body 11 in a sealed manner to a liquid chamber 22. Between the liquid port 14 and chamber 22 a non-return valve 23 prevents flow from 14 to 22. Valve 23 has a stem 24 passing through seating 25 and projects into chamber 22. Seating 25 is sealed against body 11 by an O ring 26 and is held in place by distance tube 27, spring retainer 28 and circlip 29. A spring 30 between retainer 28 and the head of non-return valve 23 holds the valve upon its seating. Body 11 adjacent to chamber 22 has an internal screw thread 31 receiving the screw threaded portion of sleeve housing 32. A standardised bayonet 33 is formed on the outside of 32. Sleeve housing 32 is sealed in body 11 by joint ring 34 and locked by set screw 35. Within the sleeve housing 32 is a sliding sleeve 36 urged outwardly by spring 37 acting on shoulder 38 of sleeve 36. Sleeve 36 is sealed in housing 32 by O ring 39. The inner end of sleeve 36 projects through 32 into chamber 22 and circlip 40 retains the sleeve against outward motion. When the sliding sleeve is moved inwardly circlip 40 contacts stem 24 of non-return valve 23. At the outer end of sleeve 36 the bore is conical in shape and packing ring 41 forms part of the conical bore.

The central stem 21 is within sleeve 36 and is supported by guide 42 sliding in sleeve 36. Guide 42 has slots formed in it for the passage of fluid.

The parts described so far with reference to FIGURE 1 form the apparatus as installed in an aircraft. A standardised charging coupling is attached to the unit.

Referring now to the drainage coupling as shown in FIGURES 2 and 3, this consists in a hollow body 50 having a heat insulating case 51 surrounding it. Hose 52 is attached to one end of the body by flange 53 having bolts 54 and sealing ring 55. Within the body 50 a tubular member 56 having an annular seal 57 at one end and a transverse pin 58 at the other is biased inwardly by spring 59 acting upon flange 60 adjacent to pin 58. The other end of spring 59 engages a ledge 61 in the body. The ledge supports tubular member 56 and an O ring seal is incorporated in the ledge. At the open end of body 50 three bayonet pegs 62 project into the bore of the body. A ring 63 in the open end of the body is spring loaded outwardly by spring 64. Pin 58 is contacted by cam 65 carried on splined torque shaft 66 which passes in a sealed manner through the wall of body 50 to carry an insulated operating lever 67.

Operation of known existing filler build-up and vent valves will now be briefly described with reference to FIGURE 1. A charging hose coupling is attached to the fixed bayonet of unit 10 and central stem 21 is moved inwards to unseat valve 19, pressure in converter 12 is released via conduit 15, gas port 16 and vent port 18. When the coupling is complete valve 19 has closed communication from converter 12 to supply port 17 and a fluid tight seal made between packing ring 41 and the charging hose coupling. Liquid oxygen under pressure flows from the charging hose through the slots in guide 42 into liquid chamber 22 and lifts non-return valve 23 from its seating 25 and flows to converter 12 via liquid port 14 and conduit 13. The gas is vented via 15, 16 and 18. During the filling operation sliding sleeve 36 has not moved as the force of spring 37 is stronger than the spring force from the charging hose coupling creating a seal with 41.

*Draining*

When it is required to drain the system of liquid oxygen a suitable container and hose are attached to the fixed bayonet of unit 10 by means of the drainage coupling shown in FIGURE 2. The drainage coupling is pushed onto sleeve housing 32 and then twisted until the bayonet pegs 62 are fully locked in the bayonet on 32. During this operation ring 63 has contacted the end of 32 and spring 64 is compressed so that a load is applied to bayonet pegs 62 holding them in engagement. The drainage coupling is now attached but no liquid flow takes place until operating lever 67 is moved. When lever 67 is moved to either side of the central position the splined torque shaft 66 rotates cam 65 which moves tubular member 56 against the action of spring 59. The annular seal 57 contacts the end face of sleeve housing 32 and forms a fluid tight joint. Further motion of the insulated operating lever overcomes the force of spring 37 and sliding sleeve 36 moves inwardly so that circlip 40 contacts stem 24 of non-return valve 23 tilting the valve on its seating 25 to allow liquid oxygen to flow from the liquid phase of converter 12 under pressure through conduit 13, liquid port 14, chamber 22, hollow sliding sleeve 36 and draining coupling through the hose to a suitable container.

During the drainage operation central stem 21 has not been moved and the working pressure in the converter is used to force liquid oxygen out of the converter. The area of the bore of valve seating 25 is the effective area of valve 23 acted upon by the liquid pressure. This substantially prevents any leakage during normal working of the system.

Upon release of lever 67 by an operator the drainage coupling returns to the inoperative position due to the action of springs 37 and 59 on cam 65 and the non-return valve 23 returns to its seating 25 to stop flow of liquid from the converter.

I claim as my invention:

1. A filler, build-up, vent and drain valve unit of the type described for a liquid gas system wherein a non-return valve has an effective area acted upon by fluid pressure substantially equal to the area of the bore of its seating, said non-return valve having a stem which passes through said seating to lie adjacent to the inner end of a sliding sleeve, said sliding sleeve being hollow and spring urged away from said stem, said sleeve having means mounted thereon for transferring motion from said sleeve to said stem in order to tilt said non-return valve to permit fluid flow for draining said system.

2. A drainage coupling for attachment to a filler, build-up, vent and drain valve unit as claimed in claim 1 comprising an insulated body containing a tubular member capable of axial motion relative to the body, said body having one end attached to a drainage hose and the other end for coupling to said unit, a seal between the body and the tubular member, one end of the tubular member being formed to provide a seal against the end of the sliding sleeve in said unit when the tubular member is moved axially to contact the sleeve.

3. A drainage coupling for attachment to a filler, build-up, vent and drain valve unit as claimed in claim 1 comprising an insulated body containing a tubular member capable of axial motion relative to the body, said body having one end attached to a drainage hose and the other end for coupling to said unit, a seal between the body and the tubular member, one end of the tubular member being formed to provide a seal against the end of the sliding sleeve in said unit when the tubular member is moved axially to contact the sleeve, the body being provided with an operating handle and an associated cam for axially moving said tubular member.

4. A drainage coupling for attachment to a filler, build-up, vent and drain valve unit as claimed in claim 1 comprising an insulated body containing a tubular member capable of axial motion relative to the body, said body having one end attached to a drainage hose and the other end for coupling to said unit, a seal between the body and the tubular member, one end of the tubular member being formed to provide a seal against the end of the sliding sleeve in said unit when the tubular member is moved axially to contact the sleeve, the body being provided with an operating handle and an associated cam for axially moving said tubular member, said member being resiliently biased in the body toward said hose end and said cam being formed such that the resilient bias of the tubular member returns the operating handle to an inoperative position when the drainage coupling ceases to be manually actuated.

References Cited in the file of this patent

UNITED STATES PATENTS

| | | |
|---|---|---|
| 1,076,267 | Carlisle | Oct. 21, 1913 |
| 1,762,503 | Buckner | June 10, 1930 |
| 2,034,933 | Wilson | Mar. 24, 1936 |
| 2,598,417 | Niemann | May 27, 1952 |